United States Patent [19]

Grosseau

[11] 3,953,691

[45] Apr. 27, 1976

[54] INERTIA SWITCH FOR DETECTING IMPENDING LOCKING OF A ROTARY MEMBER, SUCH AS A VEHICLE WHEEL

[75] Inventor: Albert Grosseau, Chaville, France

[73] Assignee: Societe Anonyme: Automobiles Citroen, Paris, France

[22] Filed: July 22, 1974

[21] Appl. No.: 490,667

[30] Foreign Application Priority Data

July 23, 1973 France .............................. 73.26921

[52] U.S. Cl. .......................... 200/61.46; 188/181 R; 200/80 R

[51] Int. Cl.[2] ...................... H01H 35/10; B60T 8/00

[58] Field of Search .............. 200/19 R, 30 R, 31 R, 200/31 CA, 61.45 R, 61.46, 80 R; 188/181 R, 181 A; 73/517 A, 535–537, 550

[56] References Cited

UNITED STATES PATENTS

| | | | |
|---|---|---|---|
| 2,687,047 | 8/1954 | O'Connor | 200/61.45 R X |
| 2,853,571 | 9/1958 | Henderson et al. | 200/61.46 |
| 2,966,564 | 12/1960 | Cunningham | 200/61.46 |
| 2,972,027 | 2/1961 | Henry-Biabaud | 200/61.46 |
| 2,975,248 | 3/1961 | Lucien | 200/61.46 |
| 3,352,388 | 11/1967 | Leiber | 200/61.46 X |
| 3,563,350 | 2/1971 | Leiber | 188/181 A |

*Primary Examiner*—James R. Scott
*Attorney, Agent, or Firm*—Fitzpatrick, Cella, Harper & Scinto

[57] ABSTRACT

An inertia switch for detecting impending locking of a rotaty member, such as a vehicle wheel, and having a variable deceleration detection threshold has a flywheel rotatable on a shaft adapted to be driven by the rotary member, a flywheel drive element on the shaft and biased by a spring into engagement with a stop on the flywheel, the flywheel and drive element carrying respective contacts of a pair of closable contacts which are open when the drive element is engaged with the stop, and a weighted lever pivoted on the flywheel eccentrically of the shaft, and co-operable with the drive element to apply a force dependent upon the rotational speed of the flywheel to oppose closing of the contacts. A rigid link on the spring may connect a free end of the lever with the drive element, and the lever may be a bell crank having one weighted limb and a second limb which abuts against the drive element and to which the spring can be attached. The tension in the spring and the maximum separation of the contacts are adjustable.

8 Claims, 6 Drawing Figures

INERTIA SWITCH FOR DETECTING IMPENDING LOCKING OF A ROTARY MEMBER, SUCH AS A VEHICLE WHEEL

BACKGROUND OF THE INVENTION

This invention relates to an inertia switch having an operating threshold which is dependent upon the speed of rotation of the switch.

Inertia switches are known and are frequently used in braking system of motor vehicles to prevent the wheels of the vehicle locking during braking.

The known switches, such as that disclosed in U.S. Pat. No. 2,972,027, generally consist of a flywheel driven by an element mounted on a shaft which is rotated at a speed depending upon the rotational speed of a vehicle wheel. Deceleration of the wheel as a result of braking causes the flywheel to pivot relative to the drive element and to close the contacts of an electrical switch, which contacts are respectively connected to the drive element and the flywheel. Before the flywheel can pivot forwards relative to the drive element, the inertia of the flywheel must be greater than a return force provided by a resilient element secured between the flywheel and the drive element. The deceleration of the drive element must therefore be sufficient for this return force to be overcome if the switch is to be actuated. Calibration of the resilient element determines the value of this return force and hence the deceleration threshold below which the electrical switch does not close. This makes it possible to distinguish from wheel deceleration not due to deliberate hard braking.

However, with these prior art devices the value of the deceleration threshold is fixed and is independent of the speed of rotation of the device and hence of the wheel. Therefore, particularly at low speeds, because the inertia of the flywheel may be insufficient to overcome the return force of the resilient means, the wheel can become locked without the switch being actuated.

During braking at high or medium speeds the switch may be actuated several times. While the inertia of the flywheel is variable, because it depends on the speed of rotation, which, of course, decreases during braking, the return force provided by the resilient element remains constant. Consequently, the response time of the switch increases as the vehicle slows down, and the frequency at which the switch is actuated decreases accordingly, thereby preventing optimum braking.

SUMMARY OF THE INVENTION

The present invention provides an inertia switch having a variable operating threshold for detecting incipient locking of a rotary member, such as a vehicle wheel comprising, a shaft adapted to be rotated by the rotary member, a flywheel rotatably mounted on the shaft, a flywheel drive element mounted on the shaft for rotation therewith but also capable of rotation relative thereto, and cooperable with a stop member on the flywheel, a first electrical contact on the drive element engageable with a second electrical contact on the flywheel, the contacts being spaced apart when the drive element is engaged with the stop member, resilient return means acting between the flywheel and the drive element and biassing the stop member and the drive element into engagement and additional return means for applying a force, which is dependent upon the rotational speed of the flywheel, between the flywheel and the drive element, which force opposes closing of the contacts, the additional return means including a weighted lever pivotally mounted on the flywheel, eccentrically of the shaft axis, and the lever being arranged to cooperate with the drive element.

The lever may co-operate with the drive element through a link articulated between an end of the lever and the drive means.

The resilient return means may be a spring secured between the lever and the flywheel.

BRIEF DESCRIPTION OF THE DRAWINGS

Some embodiments of the invention are described below, by way of example, with reference to the accompanying drawings in which.

DESCRIPTION OF PREFERRED EMBODIMENTS

Figure 1:
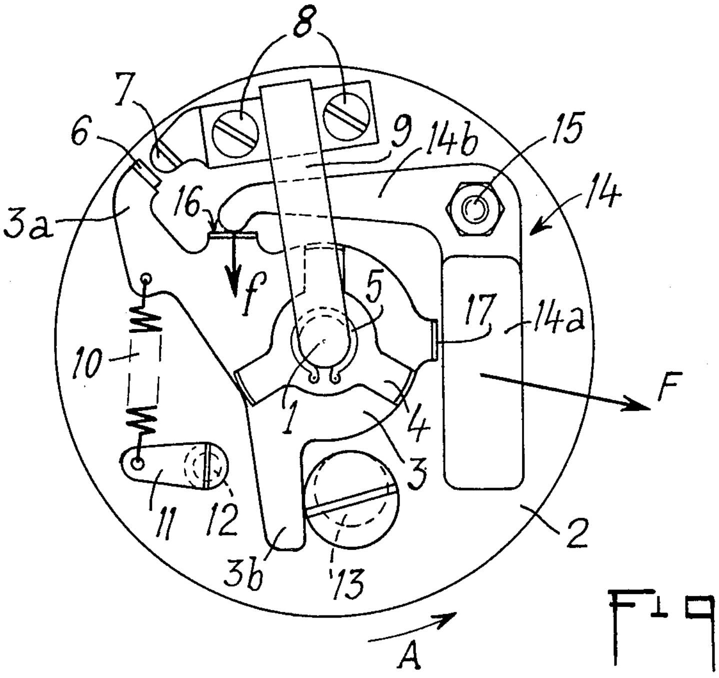
FIG. 1 is a plan view of one embodiment of the present invention illustrating the arrangement of applicant's novel inertia switch including the weighted lever pivotally mounted on the flywheel.

For convenience, corresponding parts in the different Figures have been indicated by the same reference numerals.

Some of the component parts of the inertia switch shown in FIG. 1 are similar to those of the switch described in French Pat. No. 1,194,791. The switch comprises a shaft 1 on which a flywheel 2 is rotatably mounted, but locked against axial movement. A drive element 3 is secured to the shaft above the flywheel by means of a resilient washer 4, the washer being held by a circlip 5 which clamps the element 3 against a shoulder on the shaft 1 between the flywheel 2 and the element 3. The washer 4 is such that element 3 has frictional engagement with the shaft. The drive element carries an electrical contact 6 at the end 3a while another contact 7 is connected to the flywheel 2 by two fixing screws 8, the two parts 2 and 3 being electrically insulated from one another. A tag 9 extending from the contact 7 extends above the drive element 3, its free end being axially in line with the shaft 1, for contact with a current output contact on a fixed cover (not shown) which caps the device.

A resilient return spring 10 is fixed between the flywheel 2 and the drive element 3. It is connected to the flywheel through a lever 11 adapted to be locked in any angular position about a fixing screw 12. The spring acts to hold the end 3*b* of the element 3 in contact with a screw head 13 carried by the flywheel 2. The screwhead 13 is eccentric relative to the screw shaft which is screwed into the flywheel 2, so that the position of the contact between the end 3*b* of the element 3 and the screw head can be altered to adjust the maximum spacing between the two contacts 6 and 7.

A bell crank 14, is articulated on the flywheel 2 at its apex about a pivot 15. Limb 14*a* of the bell crank is weighted and limb 14*b* is adapted to engage a surface 16 of the element 3. A surface 17 of element 3 opposite the weighted limb 14*a* of the bell crank limits pivotal movement of the bell crank.

Figure 2:
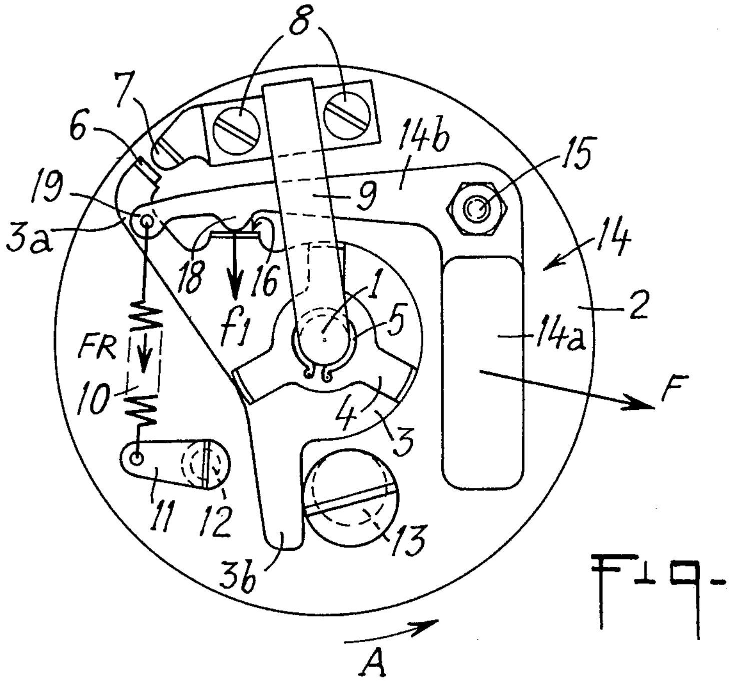
FIG. 2 is a view similar to FIG. 1 illustrating a further embodiment of the invention.

In the embodiment illustrated in FIG. 2, lever 14 has a limb 14*b* provided with a projection 18 held in contact with the surface 16 on the element 3, by spring 10 secured at the end 19 of the limb 14*b*. The spring therefore acts between the flywheel 2 and the element 3 through the limb 14*b* of the lever 14.

Figure 3:
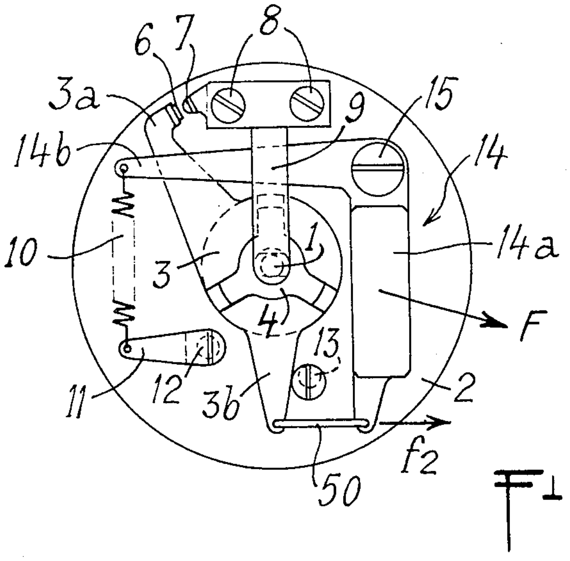
FIG. 3 is a view similar to FIGS. 1 and 2 but illustrating a construction according to which one end of the weighted lever is connected by the link to the drive element.

The embodiment of the invention shown in FIG. 3 has the end of limb 14*a* of the bell crank 14 connected to the element 3 at its end 3*b* by a link 50. The latter is articulated on element 2 and bell crank so as to permit rotation of the flywheel 2 relative to the element 3. The spring 10 extends between the flywheel 2 and the limb 14*b* of the bell crank, and forms a return spring for the flywheel 2 and the element 3 since it acts between the flywheel and the element through the bellcrank 14 and the link 50.

Figure 4:
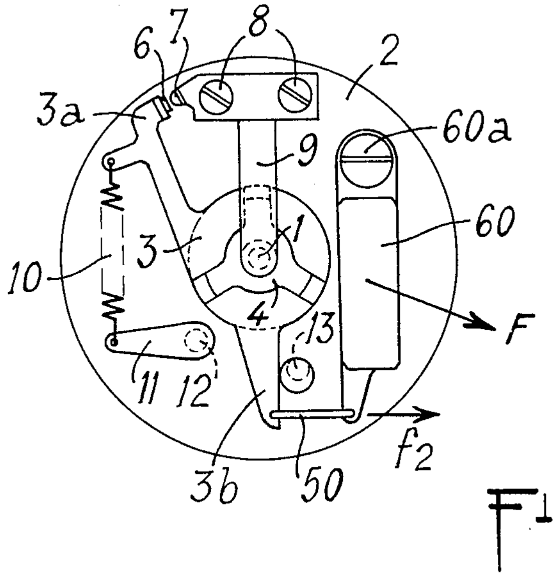
FIG. 4 is a view similar to those of FIGS. 1 to 3 but illustrating a modified disposition of the resilient return means.

In the switch shown in FIG. 4, the bell crank is replaced by an elongate weight 60 articulated on the flywheel 2 about a pivot 60*a*. The free end of weight 60 is connected to the element 3 by a link 50 identical to the link of FIG. 3. The return spring 10 in this case acts directly between the element 3 and the flywheel 2.

Figure 5:
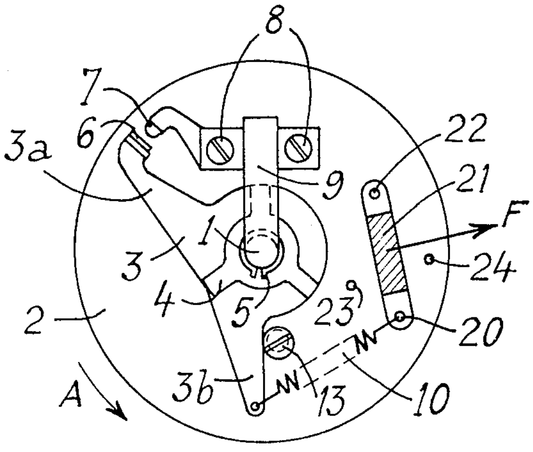
FIG. 5 is similar to the previous FIGS. but illustrates yet another disposition of the resilient return means as well as of the weighted lever.
Figure 6:
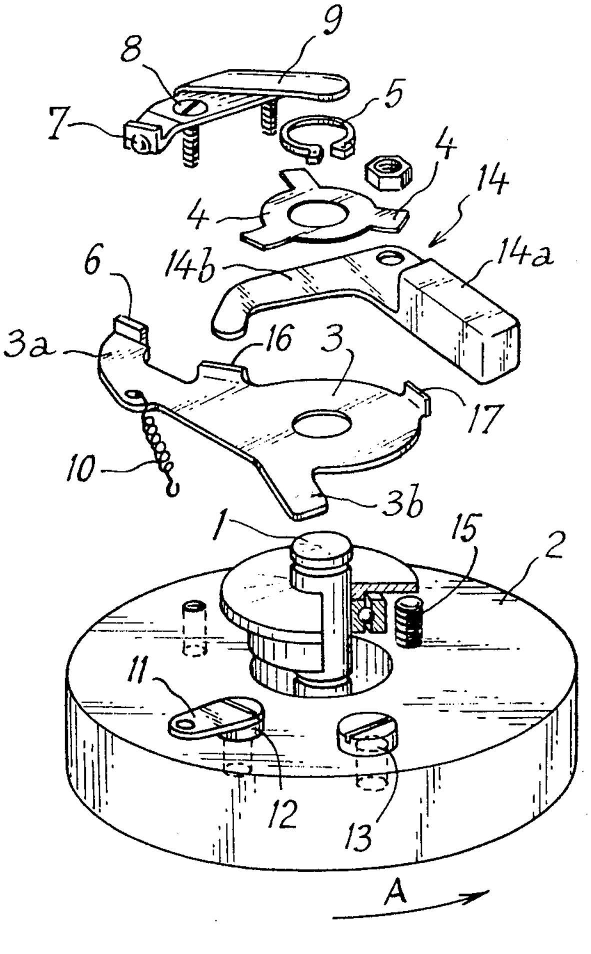
FIG. 6 is an exploded perspective view of the structure of FIG. 1.

FIG. 5 shows an embodiment of the switch in which the spring 10 is connected on the one hand, to the end 3*b* of the element 3 and, on the other hand, to one end 20 of a weighted lever 21 articulated on the flywheel 2 by a pivot 22 at its other end. Lever 21 is situated between two pins 23 and 24 which are also secured to the flywheel 2 and which form stops for limiting the pivotal movement of the lever.

The direction of rotation of the devices is counter clockwise as indicated by arrow A in FIGS. 1, 2 and 5.

In operation, the device is rotated by a coupling between a vehicle wheel axle and the shaft 1. An example of such a coupling is described in the abovementioned French Patent.

Generally in all the switches shown rotation of the shaft 1 is transmitted to the drive element 3, through the fricton connection provided by the resilient washer 4. The end 3*b* of the element 3 is normally held in contact with the screw head 13 by the return spring 10, and thus the flywheel 2 and all the components fixed on the flywheel 2 rotate with element 3.

During rotation of the FIG. 1 device the weighted limb 14*a* of the bell crank 14 is subjected to centrifugal force F which tends to rotate the bell crank 14 about its pivot 15. This rotation is resisted by the surface 16 of the element 3, on which the end of the limb 14*b* bears. This contact between surface 16 and limb 14*b* results in a force *f* between the bell crank to the element 3.

Rotation of the device shown in FIG. 2 results in the weighted limb 14*b* of the lever 14 being subjected to a centrifugal force F. The force F at the surface 16, is equal to the force *f* as in FIG. 1, due to centrifugal forces on the bell crank plus the return force FR exerted by the spring 10 on the limb 14*b*.

In the embodiment shown in FIGS. 3 and 4, the centrifugal force F to which the limb 14*a* of the lever 14 (FIG. 3) or the weight 60 (FIG. 4) is subjected is transmitted as a force $f_2$ to the element 3 through the link 50. The connection between the link 50 and the limb 14*a* or the weight 60 is stiffened by the force $f_2$ and consequently more energy is required to deform it and permit rotation of the flywheel 2 relative to the element 3.

With regard to the switch of FIG. 5, during rotation, the weighted lever 21 is subjected to a centrifugal force F which tends to rotate it about its pivot point 22. At a high speed of rotation the force F is sufficiently large to overcome the return force of the spring 10 and the lever 21 is applied against the stop 24. If the speed of rotation is low, the lever 21 remains in contact with the stop 23. Finally, at an intermediate speed, there is equilibrium between the centrifugal force and the return force applied to the lever 21 and the latter assumes an intermediate position between the two stops, as shown in the drawing.

When a braking force, for example, is applied to the wheel of a vehicle to which one of the described devices is connected, the shaft 1 and the element 3 connected thereto undergo deceleration and hence their speed of rotation falls. The flywheel 2 tends to continue rotating at the speed as before braking, but this tendency is opposed, in the embodiments of FIGS. 1 and 2, on the one hand, by the return spring 10, which opposes pivoting of the flywheel 2 relative to the drive element 3 and, on the other hand, by the force f at the surface 16, this force being proportional to the centrifugal force to which the limb 14*a* of the bell crank 14 is subjected and opposing rotation of the flywheel 2 relative to the element 3. The resultant force opposing this pivoting is therefore the sum of a fixed force (at least at the start of this pivoting movement), which is the return force provided by the spring 10 and a variable force dependent upon the speed of rotation of the device. The value of the return force of the spring 10 is adjustable by means of the lever 11, which allows the length of the spring and hence its strength, to be fixed so that the device recognises accidental wheel deceleration independent of a deliberate hard braking action.

In the case of the two embodiments described with reference to FIGS. 3 and 4, pivoting of the flywheel 2 relative to the element 3 is opposed on the one hand, by the return force of the spring 10 which acts directly (FIG. 4) or indirectly (FIG. 3) between the flywheel and the element, and on the other hand by the force $f_2$ which is proportional to the centrifugal force to which the limb 14*a* of the lever 14 (FIG. 3) or the weight 60 (FIG. 4) is subjected, this latter force being transmitted to the element 3 by means of the rigid link 50. It will be apparent that for the flywheel 2 to pivot relative to the element 3 the inertia force of the flywheel must be sufficient to overcome both the return force of the spring 10 and the force $f_2$.

In the case of FIG. 5, pivoting of the flywheel 2 relative to the element 3 is opposed by the return force of the spring 10. This return force is equal to a given minimum value corresponding to the tension in the spring 10 when the lever 21 abuts the pin 23, plus the increase in tension due to the spring being stretched as a result of the pivotal movement of the lever 23 when the device is rotated.

In each of the described embodiments the device is sufficient for the inertia of the flywheel to overcome the return forces, the contact 7 carried by the flywheel 2 comes into contact with the contact 6 carried on the element 3. An electrical circuit is then closed the signal being taken out of the device via the tag 9, for example to control a venting valve for the braking elements. The switch is closed for the entire period required by the flywheel to dissipate its surplus kinetic energy, such dissipation occurring in the form of friction of the element 3 on the shaft 1 as the flywheel and element 3 are rotated on the shaft. Once the flywheel has slowed down it moves to take up its original position relative to the element 3 with the end 3*b* of the element 3 engaging the screw head 13 and being held in contact therewith by the return force. During this braking of the flywheel of FIG. 1, bell crank 14 may swing about its pivot 15 and in order to limit the amplitude of these movements the element 3 is provided with a surface 17 which acts as a stop for the weighted arm 14*a* of the bell crank.

In all of the cases described, the force by which the flywheel 2 is biased towards the component 3 is variable so that the resulting device has a variable deceleration detection threshold. At high speeds the force opposing the pivoting of the flywheel 2 in relation to the element 3 is greater than at low speeds. Consequently, to bring the two contacts 6 and 7 together the deceleration of the shaft 1 must be greater at high speed that at low speed.

This arrangement and its result have the following advantages: By appropriate choice of the initial adjustment of the spring 10, a very low minimum detection threshold can be defined so that at low speeds of rotation of the shaft 1, for a given deceleration of the shaft, the inertia force of the flywheel 2 is above this detection threshold and always results in closure of the switch formed by the two contacts 6 and 7. The performance of the device is therefore improved by extending its operating range downwards to lower speeds. This is advantageous particularly in the case of road vehicle travelling at low speeds on a slippery road.

Also, appropriate choice of the weights carried by the levers 14 and 21 enables the curve showing the variation of the detection threshold against the speed of rotation of the device to be determined and allows the device to be operational for practically the entire braking time, by allowing the device to increase the number of closures of the switch during a braking operation.

What I claim is:

1. An inertia switch having a variable operating threshold for detecting impending locking of a rotary member, such as a vehicle wheel, comprising:

a shaft connected for rotation by said rotary member;

a flywheel idly mounted on said shaft;

a stop member carried by said flywheel;

a flywheel drive element, mounted on said shaft for rotation therewith, cooperable in the direction of rotation with said stop member to drive said flywheel in said direction of rotation;

two electrical contacts of which one is mounted on said drive element whilst the other is mounted on said flywheel, said contacts normally being spaced apart when the drive element is engaged with said stop member on the flywheel;

resilient return means coupled between said flywheel and said drive element, the effect of which tends to maintain the said stop member in contact with said drive element, and additional return means which include a weighted lever pivotally mounted by one of its ends on said flywheel and about an axis parallel to and spaced from the shaft of the device, said lever comprising means cooperating with said drive element by which at least a part of the centrifugal force to which the lever is subjected in rotation is transmitted to said drive element to increase the force of contact of said drive element on said stop member carried by said flywheel.

2. A switch as claimed in claim 1, wherein said means cooperating with said drive element are constituted by a link articulated between an end of said lever and said drive element.

3. A switch as claimed in claim 2, wherein said lever comprises in one piece, a side limb constituting a point of attachment of said resilient element then coupled between said limb and the flywheel.

4. A switch as claimed in claim 1, wherein said lever means are constituted by a side limb integral with the lever, capable of abutting, under the effect of said centrifugal force, on a surface of contact of said drive element.

5. A switch as claimed in claim 4, wherein the said drive element is provided with a surface opposite said weighted lever, constituting a stop limiting the movement of said lever when the flywheel pivots with respect to the drive element.

6. A switch as claimed in claim 4, wherein the said limb is held in contact with said surface of the drive element by the resilient return means then coupled between the flywheel and said limb.

7. A switch as claimed in claim 1, wherein the said lever means are constituted by said resilient return means coupled between said drive element and the free end of said lever.

8. A switch as claimed in claim 7, wherein two pins secured to the flywheel constitute stops limiting pivotal movement of said lever about its axis, one of said pins opposing the effect of the resilient return means at low speed or at rest and the other opposing the effect of said centrifugal force.

* * * * *